United States Patent Office 2,850,539
Patented Sept. 2, 1958

2,850,539

SYNTHESIS OF GLYCOLS FROM CONJUGATED ALIPHATIC DIOLEFINS

Stuart Schott and Edwin A. Allgeier, Cincinnati, Ohio, assignors to National Distillers and Chemical Corporation, New York, N. Y., a corporation of Virginia No Drawing. Application December 16, 1953
Serial No. 398,640

16 Claims. (Cl. 260—635)

This invention relates broadly to a novel method for the production of glycols, and more particularly, to the production of aliphatic glycols from conjugated diolefins, selected alkali metals and carbonyl compounds to yield the salts of the glycols from which the free glycols are obtained.

It is an object of this invention to provide a novel and effective method for the synthesis of aliphatic glycols utilizing relatively cheap and readily available raw materials.

It is another object of this invention to react aliphatic conjugated diolefins selectively with an alkali metal such as sodium or potassium in dispersed form to obtain the dimetallo derivatives of dimerized dienes having twice the number of carbon atoms of the starting diolefins and then to react this product with a carbonyl compound to form the salts of the aliphatic glycols which can readily be hydrolyzed to give the corresponding free glycols.

It is also a more particular object of this invention to selectively dimerize 1,3-butadiene using finely dispersed sodium and in the presence of an ether reaction medium to obtain disodiooctadienes and thereafter react these products with formaldehyde, acetaldehyde, propionaldehyde, or acetone and the like to obtain glycols and sodium salts thereof.

Another object is to provide a novel and practical method for producing in good yields and purity a heretofore unknown glycol, 2-ethyl-1,8-octane-diol which is produced by the reaction of disodiooctadiene and formaldehyde.

Other objectives of the invention will become apparent from the detailed description set forth below.

The present invention is carried out by initially treating an aliphatic conjugated diolefin with finely dispersed sodium or potassium in selected liquid ether medium and, if desired, in the presence of a relatively small amount of a polycyclic aromatic hydrocarbon and/or in the presence of a selected solid, friable attrition agent at controlled temperatures. The product obtained from this reaction is then treated with a compound of the carbonyl type such as an aldehyde or a ketone under selective reaction conditions to yield ultimately glycol products.

The initial step is a reaction which yields a dimerized product of the starting diolefin. For example, in the case where the initial reactants are sodium and butadiene, the dimeric product comprises the disodium derivatives of the aliphatic octadienes. A study of the structures indicates that this particular selective dimerization can yield the following isomeric products:

NaCH$_2$CH=CHCH$_2$CH$_2$CH=CHCH$_2$Na

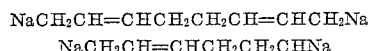
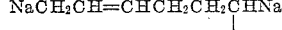

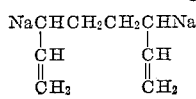

Accordingly, after the foregoing mixture of products has been reacted with formaldehyde the major primary products obtained are the following unsaturated glycols:

HOCH$_2$CH$_2$CH=CHCH$_2$CH$_2$CH=CHCH$_2$CH$_2$OH

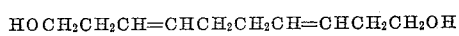

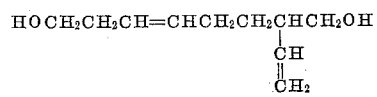

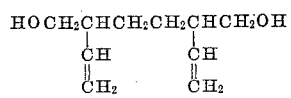

If the reactants used are other diolefins and other carbonyl compounds, then the glycol products accordingly corresponding to such structures are likewise obtained.

The generalized formula for these products is as follows:

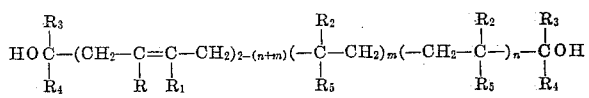

In the above formula, the letters $n$ and $m$ represent either 0 or 1; R, R$_1$, R$_2$, R$_3$, and R$_4$ represent either an alkyl, aryl, aralkyl or alkaryl group or a hydrogen atom, and R$_5$ represents an alkenyl group.

The diolefins which are useful for this improved process include any aliphatic conjugated diolefin such as, for example, butadiene, isoprene, dimethylbutadiene, the pentadienes, such as the methyl-1,3-pentadienes, and the like. In general, it is desirable to use the conjugated aliphatic diolefins having from 4 to 8, inclusive, carbon atoms. Diolefins having more than about eight carbon atoms yield final glycol products containing relatively large numbers of isomeric glycols, and such mixtures give increasing separation difficulties although the products can be made by this method. Butadiene is particularly suited for use as the diolefin reactant.

Either sodium or potassium can be used as the alkali metal reactant. Sodium is preferred over potassium since it has been found that sodium gives excellent selectivity and yields of dimerized products, and it is cheaper and more readily available. Mixtures containing a major proportion of sodium are also useful.

One factor in the successful production of the initial dimerized derivatives with which the carbonyl compounds are reacted, is the use of the alkali metal in dispersed form. If bulk sodium is used instead of dispersed sodium, it either yields no product or results largely in the formation of highly condensed polymers from the diolefin. These unwanted polymers can be substantially avoided by employing the alkali metal as a dispersion. Such dispersions are most conveniently made in an inert hydrocarbon or ether preliminary to reaction with the diene.

The reaction medium most suitable for reaction of the diolefin with the alkali metal has been found to consist essentially of certain types of ethers. The ether medium can by any aliphatic mono ether having a methoxy group, in which the ratio of the number of oxygen atoms to the number of carbon atoms is not less than 1:4. Examples includes dimethyl ether, methyl ethyl ether, methyl n-propyl ether, methyl isopropyl ether, and mixtures of these methyl ethers. Certain aliphatic polyethers are also satisfactory. These include the acyclic and cyclic polyethers which are derived by replacing all of the hydroxyl hydrogen atoms of the appropriate polyhydric alcohol by alkyl groups. Examples are the ethylene glycol dialkyl ethers such as the dimethyl, methyl ethyl, diethyl, methyl butyl, ethyl butyl, dibutyl, and butyl lauryl ethylene glycol ethers; trimethylene glycol dimethyl ether, glycerol trimethyl ether, glycerol dimethyl ethyl ether and the like. Generally, single methyl monoethers such as dimethyl ether and the polyethers of ethylene glycols, such as ethylene glycol dimethyl ether are preferred. Hydrocarbon solvents such as isooctane, kerosene, toluene, and benzene cannot be used exclusively as the reaction media in the dimerization step, since they adversely affect the dimerization reaction of the diolefin and give little or no yield of dimer products.

The ethers used as reaction media should not contain any groups which are distinctly reactive towards sodium. Further, the ether used must not be subject to extensive cleavage under the reaction conditions to yield irreversible reaction products during the dimerization process. Such cleavage action not only destroys the ether but also introduces into the reacting system metallic alkoxides which induce undesirable polymer forming reactions with the diolefins.

Although it is preferred that the reaction medium consist substantially of the ethers as specified, other inert liquid media can be present in limited amounts. In general, these inert media are introduced with the alkali metal dispersion as the liquid in which the sodium is suspended. These inert materials have the principal effect of diluting the ethers. As such dilution increases, a minimum concentration of ether is reached below which the dimerization promoting effect is not evident. It is necessary to maintain the concentration of ether in the reaction mixture at a sufficient level such that it will have a substantial promoting effect upon the diolefin dimerization reaction.

It has also been found highly useful to employ in conjunction with the dimerization reaction one or more techniques of activation for the dimerization process. This can be done in a number of ways and has the effect of increasing the rate of reaction and making the reaction more selective. For instance, a relatively small amount of at least one compound of the polycyclic aromatic class can be included in the reaction mixture. By this term it is intended to include condensed ring hydrocarbons such as naphthalene and phenanthrene, as well as the uncondensed polycyclic compounds such as diphenyl, the terphenyls, dinaphthyl, tetraphenyl ethylene, and the like. The polyphenyl compounds such as diphenyl, the terphenyls, and their mixtures have been found to be particularly useful. Concentration in the range of 0.1 to 10 wt. % based on the amount of diolefins undergoing dimerization are ordinarily quite sufficient.

It has also been found advantageous to carry out the dimerization of the diolefin in the presence of at least one solid friable attrition agent. These activating materials have been found especially valuable for increasing the reaction rate where the dimerization is done in attrition type apparatus such as a ball mill or pebble mill. Friable materials are those which are relatively easily pulverized in this type of apparatus. These materials can further be used either alone or in conjunction with the polycyclic aromatic compounds. Materials which are suitable for use as the solid friable attrition agents include inorganic solids such as alkali metal salts, for example, sodium chloride, sodium sulfate and potassium sulfate. Also useful is the class of compounds which consists of metallic and non-metallic oxides which are not reactive with metallic sodium under the reaction conditions, for example, sand (silicon dioxide), diatomaceous earth (Cellite), zircon, and rutile. Carbon, such as in the form of graphite, can also be used. The material can be utilized in a number of ways. For instance, it can be carried out by the addition to the reaction zone of a suitable attrition agent which has been preground or otherwise adjusted to a satisfactory, useful particle size. On the other hand, a relatively coarse size salt, oxide or other suitable material can be added to a pebble mill or ball mill and, in contact with the solid, alkali metal, the friable attrition agent is ground down to effective size.

It is further highly desirable in the process that the reaction temperature in the dimerization step be held below 0° C. The temperature range between −20° to −50° C. is the preferred one for diolefin dimerization. At higher temperatures, the ether diluents tend to yield cleavage products with the result that sufficient alkoxide by-products are formed to yield high molecular weight polymeric products.

In the second step of the reaction a suitable carbonyl type compound is added to the dimerized product from the diolefin. This dimerized product is a disodiodiene which will react under appropriate conditions with organic compounds containing carbonyl groupings. These carbonyl compound reactants may be varied quite widely to yield a variety of different types of glycols. Aldehydes of the aliphatic class such as formaledhyde, paraformaldehyde, acetaldehyde, propionaldehyde, butyraldehyde, isobutyraldehyde, and the octylaldehydes such as 2-ethylhexaldehyde, can be employed. Aromatic and heterocyclic aldehydes such as benzaldehyde and furfural can be used. It is also possible to use other aldehydes such as salicylaldehyde, anisaldehyde, cinnamaldehyde, piperonal, vanillin, acrolein, and crotonaldehyde. Carbonyl compounds of the ketone class can also be employed, for instance, acetone, methyl ethyl ketone, diethyl ketone, acetophenone and benzophenone. Other usable ketones include methyl vinyl ketone, mesityl oxide, phorone and benzoquinone. Generally, it is preferred to employ carbonyl compounds of not more than eight carbon atoms, since those having a greater number yield reaction products which are increasingly difficult to purify and separate. It is also possible to obtain polymeric tertiary alcohols by reaction of the dimeric intermediates with selected organic esters. Mixtures of carbonyl compounds may also be used if desired, although they also produce more complex product mixtures.

The reaction of the dimetallic diene compounds with the appropriate carbonyl compound is preferably carried out at a temperature below +50° C., preferably in the range of −50 to 0° C.

While proportions of various reactants are not critical, optimum yields of the dimetallic dimer intermediate can be obtained only if the alkali metal, for instance, sodium, is present in finely dispersed form and in amounts equivalent to or slightly in excess of the molecular equivalents of diolefin employed. The same relative ratio of reactants is also effective in the reaction of the dimeric derivative with the carbonyl compound, with the restriction that two equivalents of carbonyl compound are required for each molecule of dimetallic dimer.

In the general practice of the invention, the dimerized derivatives are prepared by reaction of a conjugated diolefin with the alkali metal in a suitable ether medium, in the presence of a small amount of a polycyclic hydrocarbon and/or in the presence of a selected solid friable attrition agent. The resulting dimetallic diene then is allowed to react with the carbonyl compound introduced into the mixture, either in the vapor, liquid, or solid state, with or without further dilution with an inert liquid or gaseous diluent. The resultant reaction product then is "quenched" by the gradual addition of water or an alcohol to liberate the glycols from the sodium alkoxides which are initially formed. The glycols are isolated from this final reaction mixture by extraction, distillation or other suitable means. If a water soluble attrition agent has been used, it can be dissolved away from the more insoluble organic products by water. If the material used is water insoluble, then the separation of the products can readily be accomplished by chemical or physical means.

This reaction may be carried out either in a batchwise or in a continuous manner and it is not intended to limit the process to any particular method of operation.

In the instance where butadiene is the aliphatic diolefin starting material, and the carbonyl compound used is formaldehyde, there results from this method a mixture of $C_{10}$ unsaturated glycols. After hydrogenation, the saturated glycols obtained include 2-ethyl-1,8-octanediol which has been identified and is believed to constitute a heretofore unknown composition of matter. The glycol products obtained by this particular synthesis constitute a series of compounds in which the two alcohol groups are separated by from 6 to 10 carbon atoms. If some other, higher molecular weight diolefin is employed in the initial reaction, then the structure of the final glycol products will vary accordingly.

The unsaturated glycols or their alkali metal alkoxides or other derivatives can be hydrogenated at the double bonds to yield the corresponding saturated compounds. This also affords a convenient and accurate way to identify the structures of the unsaturated intermediates as well as the final products.

These glycol products are useful in the synthesis of "drying oil" types of polyesters by esterification with saturated and unsaturated di- and mono-basic acids, and in alkyd resins, and the like. They are also particularly useful for hydrogenation to the corresponding saturated glycols which are quite valuable in the synthesis of polyester plastics and rubbers, plasticizers, synthetic lubricants, polyurethanes, and other products.

The more detailed practice of the invention is illustrated by the following examples, wherein parts are given by weight unless otherwise specified. These examples and embodiments are illustrative only, and the invention is not in any way intended to be limited thereto except as indicated by the appended claims.

Example I

A mixture of disodiooctadienes was prepared from one mole of butadiene and one gram atomic weight of sodium in dimethyl ether reaction medium. The reaction was carried out by initially preparing finely divided sodium dispersion in isooctane and contacting the dispersion in the presence of the dimethyl ether with butadiene in the presence of about 1 to 2% of terphenyl. A temperature of $-25°$ C. was maintained. The estimated yield of disodiooctadienes from this reaction was 0.81 mole. When this initial reaction was complete, 1.45 moles of gaseous formaldehyde were admitted to the mixture over a two-hour period while maintaining a reaction temperature of about $-25°$ C. by refluxing the dimethyl ether. The reaction mixture thickened during this condensation because of the formation of the "R"—$CH_2$—O—Na grouping, the "R" indicating one end of the octadiene chain. The resulting disodium salts of the $C_{10}$ glycols which formed were treated with methanol and then with water to destroy any unreacted sodium and to liberate the unsaturated glycols from the corresponding sodium alkoxides. The layers were separated and the inert solvents removed from the organic layer. The residual oil was dissolved in ethanol and hydrogenated over a platinum catalyst. Removal of the ethanol and catalyst gave about 50% yield of a viscous oil of saturated glycols. The yield is based on the amount of formaldehyde added. Distillation at reduced pressure (1 mm.) yielded the following fractions:

I. 50–130° C., Foreshot (4.9 parts)
II. 131–139° C., 2,5-diethyl-1,6-hexanediol (5.0 parts)
III. 139–150° C., 2-ethyl-1,8-octanediol (15.5 parts)
IV. 151–172° C., 1,10-decamethylene glycol (10.0 parts)
V. 172° C., Residue (4.6 parts).

Fraction II was identified as 2,5-diethyl-1,6-hexanediol; $\eta_D^{25}$, 1.4619; $d_4^{25}$, 0.935, hydroxyl percent, 19.20 (previously reported: Hill and Adkins, J. Am. Chem. Soc., 60, 1033 (1938); B. P. 133–4/1 mm.; $\eta_D^{25}$, 1.4621; $d_4^{25}$, 0.931; hydroxyl percent, 19.53). Fraction III is a new glycol, 2-ethyl-1,8-hexanediol, a liquid at room temperature, $\eta_D^{25}$, 1.4604; $d_4^{25}$, 0.93 16; $MR_D$, calc., 51.4, found, 51.3; hydroxyl percent, calc., 19.53, found 19.75. The same constants and analytical data were obtained from an authentic sample made by reduction of dimethyl α-ethylsuberate.

Analysis.—Calc. for $C_{10}H_{22}O_2$; C, 68.90; H, 12.73. Found: C, 68.90; H, 12.94.

The bis-3,5-dinitrobenzensoate of this glycol melted at 97–99°.

Analysis.—Calc. for $C_{24}H_{26}O_{12}N$; N, 9.94. Found: N, 10.21.

Fraction IV consisted of 1,10-decamethylene glycol, M. P. 70–72° C. (literature value 71.5–72° C., mixed M. P. with authentic specimen, 70–72° C.

Example II

Disodiooctadiene (.88 mole) was prepared as described in Example I and was allowed to react with 1.76 moles of acetaldehyde. Isolation and hydrogenation of the glycol product as described above gave an organic product representing a substantial yield of the crude saturated glycol mixture. This product had a hydroxyl equivalent of 108.7 (theoretical value for the pure glycols is 101.1). Separation of the individual components was difficult because of closeness of their boiling points and the tendency of such secondary hydroxyl groups toward dehydration. However, this hydrogenated product was found to contain the following saturated glycol compounds as the major components:

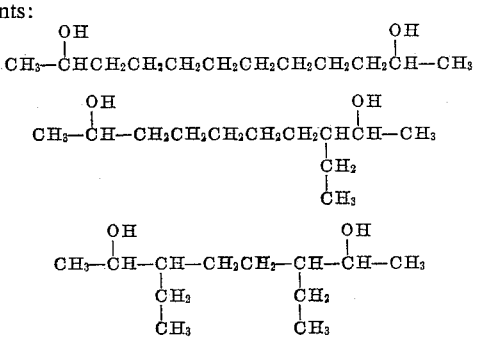

Example III

Disodiooctadiene was prepared from two moles of butadiene and 2 gram atomic weights of sodium in dimethyl ether reaction medium as described in Example I. The approximate yield of disodiooctadienes from this reaction was 0.82 mole. When this initial reaction was complete, 2.0 moles of propionaldehyde were admitted into this reaction mixture by nitrogen entrainment over a two hour period. The reaction temperature was maintained at $-25°$ C. during the reaction period. The reaction mixture thickened during the aldehyde addition due to the formation of the ether insoluble

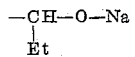

groups formed at the ends of the octadiene chain. The disodium salts of the resulting $C_{14}$ glycols were treated with methanol to destroy unreacted sodium and then with water to liberate the glycols from their salts. The oil and water layers were separated. The organic solvents were removed by distillation. The residual oil was dissolved in ethanol and hydrogenated over a nickel catalyst. Removal of the ethanol and distillation at reduced pressure gave 169 parts of material (B. P. 170–185° C./3 mm.) containing $C_{14}$ glycols, higher molecular weight glycols and hydrocarbon polymers. The present hydroxyl (6.5) corresponded to a 44% $C_{14}$ glycol content. Fractional distillation gave as the major product a mixture of the $C_{14}$ glycols distilling at 125–136° C. at 0.05 mm. pressure; hydroxyl number: found 12.2; theoretical, 14.8.

Example IV

Disodiooctadiene was prepared from two moles of butadiene and two gram atomic weights of sodium in dimethyl ether reaction medium, as described above. The approximate yield of the disodiooctadienes from this reaction was 0.77 mole. When this initial reaction was complete, 2 moles of acetone were introduced into the reaction vessel by nitrogen entrainment over a two hour period. The reaction mixture was held at a temperature of −25° C. during this addition. The mixture thickened during the reaction due to the formation of the insoluble

groups at the ends of the octadiene chain. The resulting final mixture, containing the disodium salts of the resulting $C_{14}$ glycols, was treated with methanol to destroy any unreacted sodium and then with water to liberate the glycols. The aqueous and organic layers were separated. The organic solvents were removed by vacuum distillation. The residual oil was dissolved in ethanol, and hydrogenated over a platinum catalyst. Removal of ethanol gave 203 parts of glycol product. The hydroxyl number indicated a substantial yield of $C_{14}$ glycols.

What is claimed is:

1. The method of preparing a mixture of unsaturated glycols in which the hydroxyl groups are separated by at least 6 carbon atoms, which comprises dimerizing at a temperature below about 0° C. a conjugated aliphatic diolefin in the presence of a finely divided alkali metal selected from the group consisting of sodium and potassium and in the presence of an ether diluent selected from the group consisting of an aliphatic mono ether having a methoxy group and in which the ratio of the number of oxygen atoms to the number of carbon atoms is not less than 1:4 and acyclic and cyclic polyethers which are derived by replacing all of the hydroxyl hydrogen atoms of the polyhydric alcohol by alkyl groups and a polycyclic aromatic hydrocarbon dimerization activator, reacting the organometallic diene product thus formed, unseparated from the reaction mixture, with an organic compound having at least one carbonyl grouping to form the salts of the corresponding unsaturated glycols, and hydrolyzing the salts of the unsaturated glycols so obtained.

2. The method of claim 1 wherein the organic compound is an aldehyde.

3. The method of claim 1 wherein the organic compound is formaldehyde.

4. The method of claim 1 wherein the diolefin is butadiene.

5. The method of claim 1 wherein the alkali metal is sodium.

6. The method of claim 1 comprising reacting butadiene, sodium and formaldehyde.

7. The method of preparing a mixture of unsaturated glycols in which the hydroxyl groups are separated by at least 6 carbon atoms, which comprises dimerizing at a temperature below about 0° C. a conjugated aliphatic diolefin in the presence of a small amount of polycyclic aromatic hydrocarbon and in a selected ether diluent selected from the group consisting of an aliphatic mono ether having a methoxy group and in which the ratio of the number of oxygen atoms to the number of carbon atoms is not less than 1:4 and acyclic and cyclic polyethers which are derived by replacing all of the hydroxyl hydrogen atoms of the polyhydric alcohol by alkyl groups, with finely divided sodium, immediately thereafter adding an organic compound having at least one carbonyl grouping to the reaction mixture containing the organometallic diene intermediate, and hydrolyzing the salts of the unsaturated glycols obtained.

8. The method of claim 7 wherein the organic compound is an aldehyde.

9. The method of claim 7 wherein the organic compound is a ketone.

10. The method of preparing a mixture of unsaturated glycols in which the hydroxyl groups are separated by at least 6 carbon atoms, which comprises dimerizing at a temperature below about 0° C. a conjugated aliphatic diolefin in the presence of a solid, friable attrition agent and in a selected ether diluent selected from the group consisting of an aliphatic mono ether having a methoxy group and in which the ratio of the number of oxygen atoms to the number of carbon atoms is not less than 1:4 and acyclic and cyclic polyethers which are derived by replacing all of the hydroxyl hydrogen atoms of the polyhydric alcohol by alkyl groups with finely divided sodium, immediately thereafter adding an organic compound having at least one carbonyl grouping to the reaction mixture containing the organometallic diene intermediate, and hydrolyzing the salts of the unsaturated glycols obtained.

11. The method of claim 10 wherein the organic compound is an aldehyde.

12. The method of claim 10 wherein the organic compound is a ketone.

13. The method of preparing saturated glycols in which the hydroxyl groups are separated by at least 6 carbon atoms, which comprises dimerizing at a temperature below about 0° C. a conjugated aliphatic diolefin in the presence of a finely divided alkali metal selected from the group consisting of sodium and potassium and in the presence of an ether diluent selected from the group consisting of an aliphatic mono ether having a methoxy group and in which the ratio of the number of oxygen atoms to the number of carbon atoms is not less than 1:4 and acyclic and cyclic polyethers which are derived by replacing all of the hydroxyl hydrogen atoms of the polyhydric alcohol by alkyl groups, and a polycyclic aromatic hydrocarbon dimerization activator reacting the organometallic diene product thus formed, unseparated from the reaction mixture, with an organic compound having at least one carbonyl grouping to form the salts of the corresponding unsaturated glycols, hydrolyzing the salts of the unsaturated glycols so obtained, and hydrogenating said unsaturated glycols to the corresponding saturated glycols.

14. The method of claim 13 wherein the diolefin is butadiene.

15. The method of claim 13 wherein the alkali metal is sodium.

16. The method of claim 13 wherein the organic compound is formaldehyde.

References Cited in the file of this patent

UNITED STATES PATENTS

| 2,171,867 | Scott et al. | Sept. 5, 1939 |
| 2,352,461 | Walker | June 27, 1944 |
| 2,615,906 | Stanton | Oct. 28, 1952 |
| 2,669,579 | Urban | Feb. 16, 1954 |

FOREIGN PATENTS

| 636,456 | Germany | Oct. 19, 1936 |

OTHER REFERENCES

Beilstein: Handbuch der organischen Chemie, 1941, vol. I, page 573.

Fieser et al.: Organic Chemistry, 2nd edition, 1950, page 335.

Gilman: "Organic Chemistry," vol. 1 (2nd edition), Wiley and Sons, New York, 1953; pp. 524–527.